(12) United States Patent
Kleber et al.

(10) Patent No.: US 8,757,423 B2
(45) Date of Patent: Jun. 24, 2014

(54) COMPOSITE PRESSURE VESSEL AND METHOD OF ASSEMBLING THE SAME

(75) Inventors: Richard M. Kleber, Clarkston, MI (US); John E. Carsley, Clinton Township, MI (US); Hamid G. Kia, Bloomfield Hills, MI (US); Chen-Shih Wang, Troy, MI (US); Ce Sun, Ann Arbor, MI (US); Elisabeth J. Berger, Farmington Hills, MI (US); Stephan Fell, Flörsheim (DE); Valentin Schultheis, Darmstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 824 days.

(21) Appl. No.: 12/830,219

(22) Filed: Jul. 2, 2010

(65) Prior Publication Data

US 2012/0000916 A1    Jan. 5, 2012

(51) Int. Cl.
*B65D 17/34*    (2006.01)

(52) U.S. Cl.
USPC .......... 220/617; 220/582; 220/580; 220/588; 220/586; 220/600; 220/610; 220/612

(58) Field of Classification Search
USPC ......... 220/581, 582, 586, 588, 589, 590, 591, 220/592, 601, 610, 611, 612, 613, 614, 617, 220/623
See application file for complete search history.

(56) References Cited

U.S. PATENT DOCUMENTS

| | | | | |
|---|---|---|---|---|
| 1,350,666 A | * | 8/1920 | Murphy | 220/591 |
| 3,074,585 A | * | 1/1963 | Koontz | 220/590 |
| 3,137,405 A | * | 6/1964 | Gorcey | 220/590 |
| 3,228,549 A | * | 1/1966 | Courtney | 220/589 |
| 3,360,158 A | * | 12/1967 | Klein | 220/623 |
| 3,404,796 A | * | 10/1968 | Dobbins et al. | 220/582 |
| 3,432,072 A | * | 3/1969 | Quercia | 220/613 |
| 3,662,780 A | * | 5/1972 | Marsh | 137/590 |
| 3,913,774 A | * | 10/1975 | Vajtay | 220/4.01 |
| 3,969,812 A | * | 7/1976 | Beck | 29/421.1 |
| 4,053,081 A | * | 10/1977 | Minke | 220/589 |
| 4,108,327 A | * | 8/1978 | Shonerd et al. | 220/581 |
| 4,241,844 A | * | 12/1980 | Dolveck | 220/620 |
| 4,500,006 A | | 2/1985 | Lafortune et al. | |
| 4,566,609 A | * | 1/1986 | Hoffmeister | 222/130 |
| 4,660,738 A | * | 4/1987 | Ives | 220/567.1 |

(Continued)

FOREIGN PATENT DOCUMENTS

| | | | | |
|---|---|---|---|---|
| EP | 302157 A1 | * | 2/1989 | B21D 51/24 |
| GB | 2212130 A | * | 7/1989 | B65D 6/28 |

*Primary Examiner* — Fenn Mathew
*Assistant Examiner* — Chetan Chandra
(74) *Attorney, Agent, or Firm* — Dierker & Associates, P.C.

(57) ABSTRACT

A composite pressure vessel assembly method includes fitting an end portion of a tubular member into an annular slot formed in an end cap. Sealant may be in the annular slot. The end cap includes an annular groove in an exterior surface of the end cap body portion. A first material layer is formed on an exterior surface of the tubular member. The first material layer includes a first composite material including fibers oriented circumferentially to the tubular member. A second material layer is formed on the first material layer with a portion of the second material layer being disposed into the annular groove, and includes a second composite material including fibers oriented axially to the tubular member. A third material layer is formed adjacent the second material layer and in the annular groove, and includes a third composite material including fibers having an orientation circumferential to the tubular member.

13 Claims, 5 Drawing Sheets

(56) References Cited

U.S. PATENT DOCUMENTS

| | | | |
|---|---|---|---|
| 4,690,295 A * | 9/1987 | Wills | 220/590 |
| 4,699,288 A * | 10/1987 | Mohan | 220/590 |
| 4,778,073 A * | 10/1988 | Ehs | 220/590 |
| 4,982,870 A * | 1/1991 | Van Loon | 220/586 |
| 5,100,009 A | 3/1992 | Thompson et al. | |
| 5,427,268 A * | 6/1995 | Downing et al. | 220/581 |
| 5,458,252 A | 10/1995 | Logel | |
| 5,499,739 A * | 3/1996 | Greist et al. | 220/589 |
| 6,145,693 A * | 11/2000 | Berglund | 220/589 |
| RE38,433 E * | 2/2004 | Seal et al. | 29/469.5 |
| 7,036,677 B1 * | 5/2006 | Funck et al. | 220/581 |
| 7,169,214 B2 | 1/2007 | Kubo et al. | |
| 7,350,665 B2 * | 4/2008 | Hembert | 220/632 |
| 7,503,453 B2 | 3/2009 | Cronin et al. | |
| 7,658,300 B2 * | 2/2010 | Eckert et al. | 220/581 |
| 8,091,203 B2 * | 1/2012 | Kleber et al. | 29/447 |
| 8,313,595 B2 * | 11/2012 | Blanc et al. | 156/69 |
| 8,322,559 B2 * | 12/2012 | Kuzelka | 220/642 |
| 2004/0045970 A1 * | 3/2004 | Debecker et al. | 220/586 |
| 2005/0006393 A1 * | 1/2005 | Carter | 220/581 |
| 2005/0260373 A1 * | 11/2005 | DeLay et al. | 428/36.4 |
| 2007/0012551 A1 | 1/2007 | Rohwer et al. | |
| 2007/0246475 A1 * | 10/2007 | Mazabraud et al. | 220/590 |
| 2008/0251520 A1 * | 10/2008 | Ota et al. | 220/586 |
| 2009/0308874 A1 * | 12/2009 | Lindner et al. | 220/560.05 |
| 2009/0314785 A1 * | 12/2009 | Cronin et al. | 220/590 |
| 2010/0126999 A1 * | 5/2010 | Kleber et al. | 220/582 |
| 2010/0276434 A1 * | 11/2010 | Berger et al. | 220/586 |
| 2011/0233216 A1 * | 9/2011 | Hildwein et al. | 220/581 |
| 2012/0234840 A1 * | 9/2012 | Strassburger et al. | 220/590 |

\* cited by examiner

| FITTING AN END PORTION OF A TUBULAR MEMBER INTO AN ANNULAR SLOT FORMED IN A RIM OF A BODY PORTION OF AN END CAP, THE ANNULAR SLOT HAVING A SEALANT DISPOSED THEREIN, THE END CAP FURTHER INCLUDING AN ANNULAR GROOVE FORMED IN AN EXTERIOR SURFACE OF THE BODY PORTION, THE ANNULAR GROOVE BEING OPPOSED TO THE RIM |
|---|
| ↓ |
| FORMING A FIRST MATERIAL LAYER ON AN ANNULAR EXTERIOR SURFACE OF THE TUBULAR MEMBER, THE LAYER INCLUDING A FIRST COMPOSITE MATERIAL INCLUDING FIBERS HAVING AN ORIENTATION CIRCUMFERENTIAL TO THE TUBULAR MEMBER |
| ↓ |
| FORMING A SECOND MATERIAL LAYER ON THE FIRST MATERIAL LAYER, A PORTION OF THE SECOND MATERIAL LAYER BEING DISPOSED INTO THE ANNULAR GROOVE, THE SECOND MATERIAL LAYER INCLUDING A SECOND COMPOSITE MATERIAL INCLUDING FIBERS HAVING AN ORIENTATION AXIAL TO THE TUBULAR MEMBER |
| ↓ |
| FORMING A THIRD MATERIAL LAYER ADJACENT THE SECOND MATERIAL LAYER AND IN THE ANNULAR GROOVE, THE THIRD MATERIAL LAYER INCLUDING A THIRD COMPOSITE MATERIAL INCLUDING FIBERS HAVING AN ORIENTATION CIRCUMFERENTIAL TO THE TUBULAR MEMBER |

COMPOSITE PRESSURE VESSEL AND METHOD OF ASSEMBLING THE SAME

TECHNICAL FIELD

The present disclosure relates generally to a composite pressure vessel and method of assembling the same.

BACKGROUND

Pressure vessels, such as, e.g., gas storage containers and hydraulic accumulators may be used to contain fluids under pressure. It may be desirable to have a pressure vessel with relatively thin walls and low weight. For example, in a vehicle fuel tank, relatively thin walls allow for more efficient use of available space, and relatively low weight allows for movement of the vehicle with greater energy efficiency.

SUMMARY

An assembly method is disclosed herein. The method involves fitting an end portion of a tubular member into an annular slot formed in a rim of a body portion of an end cap. The annular slot may have a sealant disposed therein. The end cap further includes an annular groove formed in an exterior surface of the body portion. The annular groove is opposed to the rim. The method further includes forming a first material layer on an annular exterior surface of the tubular member. The first material layer includes a first composite material including fibers having an orientation circumferential to the tubular member. A second material layer is formed on the first material layer with a portion of the second material layer being disposed into the annular groove. The second material layer includes a second composite material including fibers having an orientation axial to the tubular member. A third material layer is formed adjacent the second material layer and in the annular groove. The third material layer includes a third composite material including fibers having an orientation circumferential to the tubular member.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the method as disclosed herein may advantageously be used to assemble a composite pressure vessel.

DEFINITIONS

As used herein, the word "filament" means a single fiber. A single continuous filament that may be rolled on a spool is a "monofilament" as used herein. Filaments in a bunch are called a "strand" or an "end." If the filaments are all parallel to each other, the "end" is called a "roving," although graphite rovings are also referred to as "tows." If the filaments are twisted to hold the fibers together, the bundle is called a "yarn."

Either roving (tow) or yarn can be woven into a fabric. If roving is used, the fabric is called "woven roving;" if yarn is used, the fabric is called "cloth." Although the terms "yarn" and "roving" are not interchangeable, where the word "yarn" is applied in this document, it is to be understood that "roving" may be applied also. Nonwoven fabric is a fabric-like material such as "felt" made from long fibers, bonded together by chemical treatment, mechanical treatment, heat treatment, or solvent treatment.

In a roll of fabric, "warp yarns" run in the direction of the roll and are continuous for the entire length of the roll. "Fill yarns" run crosswise to the roll direction. Warp yarns are usually called "ends" and fill yarns "picks." (The terms apply equally to rovings, but yarn will be used in the rest of the discussion for simplicity.)

Fabric count refers to the number of warp yarns (ends) and fill yarns (picks) per inch. For example, a 24×22 fabric has 24 ends in every inch of fill direction and 22 picks in every inch of warp direction. Note that warp yarns are counted in the fill direction, and fill yarns are counted in the warp direction.

If the end and pick counts are roughly equal, the fabric is considered "bidirectional" (BID). If the pick count is very small, most of the yarns run in the warp direction, and the fabric is nearly unidirectional. Some unidirectional cloths have no fill yarns; instead, the warp yarns are held together by a thin stream of glue. "Unidirectional prepreg" relies on resin to hold the fibers together.

"Weave" describes how the warp and fill yarns are interlaced. Examples of weaves are "plain," "twill," "harness satin," and "crow-foot satin." Weave determines drapeability and isotropy of strength.

"Composite material" means engineered material made from two or more constituent materials with significantly different physical or chemical properties which remain separate and distinct on a macroscopic level within the finished structure. There are two categories of constituent materials: matrix and reinforcement. The matrix material surrounds and supports the reinforcement material by maintaining their relative positions. The reinforcements impart their special mechanical and physical properties to enhance the matrix properties. A synergism produces material properties unavailable from the individual constituent materials.

Reinforcement materials include fiberglass, carbon fiber, aramid fiber and the like.

A polymer matrix material is often called a resin solution. The most commonly known polymer matrix materials are polyesters, vinyl esters, epoxies, phenolic polymers, polyimides, polyamides, polypropylenes, polyether ether ketone (PEEK), and the like. It is to be understood that these polymer examples are not intended to be limiting, and that other materials are contemplated as being within the purview of the present disclosure.

Figure 1:
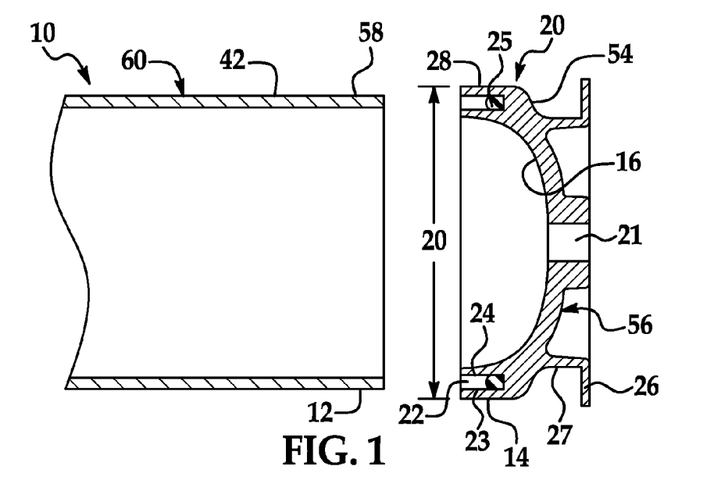
FIG. 1 is a cutaway, cross-sectional exploded view of an example according to the present disclosure.
Figure 12:
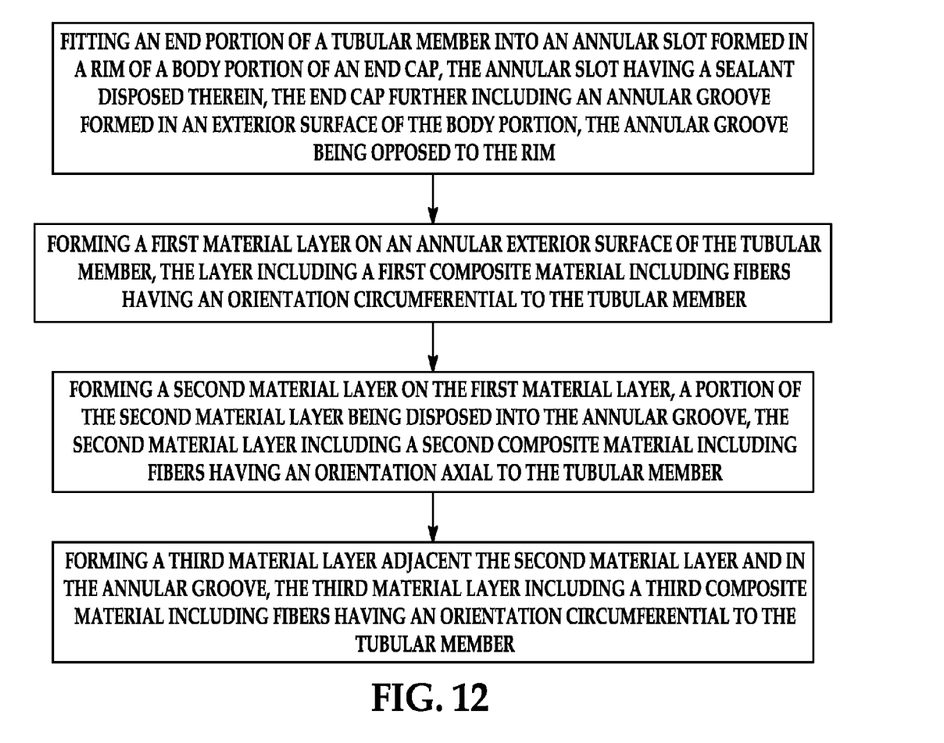
FIG. 12 is a flow chart showing an assembly method according to an example of the present disclosure.

Referring now to FIGS. 1 and 12, an example of the method disclosed herein may include fitting an end portion 58 of a tubular member 60 into an annular slot 22 formed in a rim 14 of a body portion 56 of an end cap 20. The annular slot 22 may be complementarily sized with the end portion 58 to form a light press fit. It is to be understood that a light press fit as used herein is a class of fit defined as about 0.003 inch to about 0.010 inch interference. As such, the light press fit maintains a position of the tubular member 60 relative to the end cap 20 for further processing, but does not contribute to the overall pressure storage capacity of the cylindrical pressure containment vessel 10. End cap 20 may be attached to tubular member 60 by pressing, threading, swaging, staking, welding or adhering. The annular slot 22 may have a sealant 25 disposed therein. In an example, the sealant 25 may be cured by exposure to a chemical curing agent (not shown), exposure to a curing pressure, exposure to a curing temperature, or combinations thereof. It is to be understood that any suitable chemical curing agent may be used. Some non-limiting examples of curing agents suitable for use in examples of the present disclosure include air; two-part adhesives (in which one part is an epoxy and the other part is a hardener that contains a free radical that reacts with the epoxy to trigger the curing, such action often being accelerated or initiated by the application of heat); peroxides; salts or other complexes of platinum, palladium or rhodium; dibutyltin dilaurate; stannous octoate; and combinations thereof.

Figure 2:
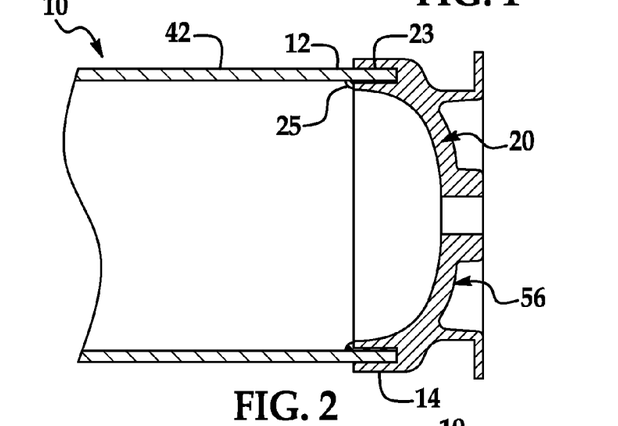
FIG. 2 is a cutaway, cross-sectional view of the parts in FIG. 1 after the parts are assembled.
Figure 3:
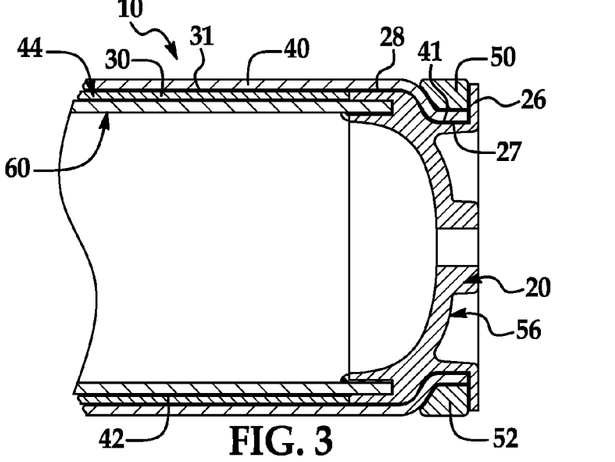
FIG. 3 is a cutaway, cross-sectional view of the assembly of FIG. 2, but with composite layers applied.
Figure 11:
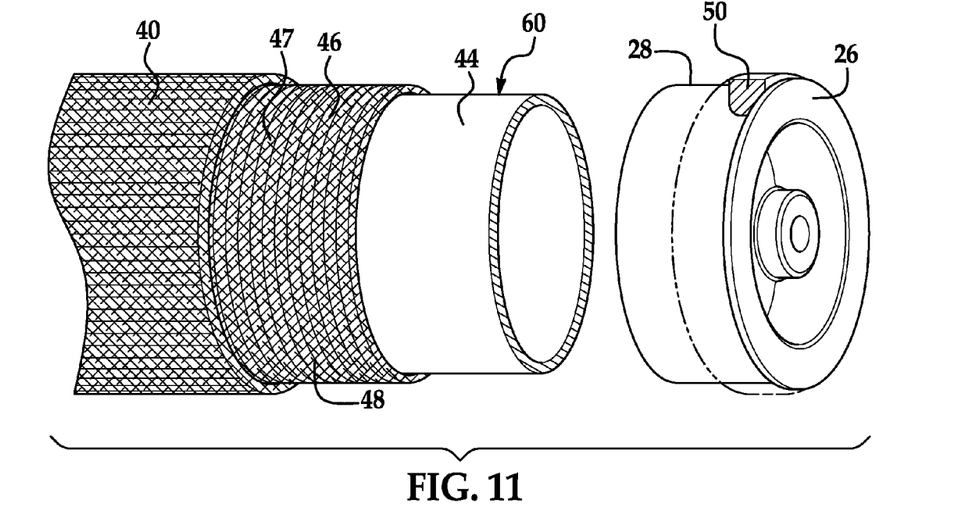
FIG. 11 is a cutaway, perspective view showing layers according to an example of the present disclosure.

Referring now to FIGS. 1, 2 and 3 together, the end cap 20 may have an annular groove 27 formed in an exterior surface 54 of the body portion 56. The annular groove 27 is opposed to the rim 14, and a wall of the annular groove 27 may be formed by a retention flange 26. A first material layer 30 may be formed on an annular exterior surface 42 of the tubular member 60. The first material layer 30 includes a first composite material 44. The first composite material 44 may include fibers 46 having an orientation circumferential to the tubular member 60, as shown in FIG. 11.

A monofilament may be wound circumferentially around the tubular member 60. It is to be understood, however, that some fibers in the first composite material 44 may be oriented in directions other than circumferential. For example, woven or nonwoven fabric made from fibers may be wrapped around the tubular member 60. Warp yarns in fabric may be oriented circumferentially, but fill yarns may be oriented crosswise to the warp yarns. As an example, a cloth having warp yarns that are circumferentially oriented may be used in the present disclosure. In another example, felt having some of the fibers oriented in the circumferential direction may be used. In woven and non-woven fabric, a percentage of circumferential fibers that contribute to an ultimate pressure carrying capability of the cylindrical pressure containment vessel 10 may be from about 90 percent to about 100 percent of the fibers in the fabric.

Reinforcement fibers in the first composite material 44 may include carbon fibers and glass fibers. The first composite material 44 may also include a binding agent which acts as a matrix material. In an example, the matrix material may be a resin (some examples of which are provided above, e.g., polyesters, polypropylenes, etc.).

Referring again to FIG. 3, the first material layer 30 may have an outer diameter that is substantially the same as an outer diameter of the body portion of the end cap 20. As used herein, the term "substantially the same" diameter means that a second material layer 40 that is disposed across a joint between the first material layer 30 and the end cap 20 will not have a kink caused by step change in diameter upon which the second material layer 40 is disposed.

The second material layer 40 may be formed on the first material layer 30, with a portion of the second material layer 40 being disposed into the annular groove 27. The second material layer 40 may include a second composite material 48 including axial fibers (shown in FIG. 11) having an orientation axial to the tubular member 60. Axial fibers may be from about 75 percent to about 100 percent of the fibers in the fabric forming the second material layer 40.

A third material layer 50 may be formed adjacent the second material layer 40 and in the annular groove 27. The third material layer 50 may include a third composite material 52. Fibers in the third material layer 50 are oriented circumferentially to the tubular member 60. In a non-limitative example, a roving or tow may be wound around the second material layer 40 at the annular groove 27, thereby forming the third material layer 50. In another example, a strip of cloth having 90 to 100 percent circumferentially oriented fibers may be wrapped around the second material layer 40 at the annular groove 27, thereby forming the third material layer 50.

Figure 10:
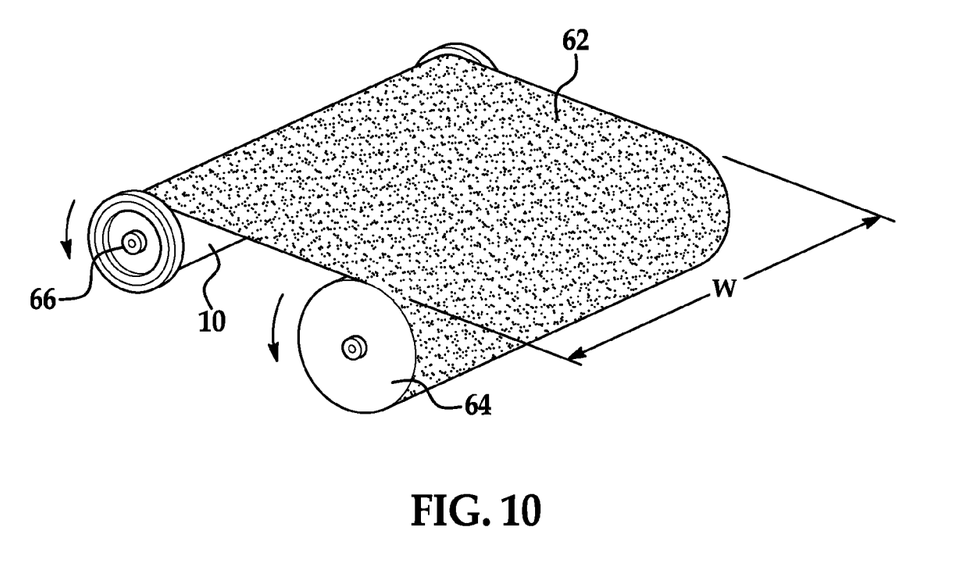
FIG. 10 is a semi-schematic perspective view showing roll-forming composite material layers according to an example of the present disclosure.

The first 30, second 40, and third 50 material layers may be formed by roll forming as illustrated schematically in FIG. 10. As used herein, "roll forming" is a process wherein a layer of reinforcement fiber fabric 62 is transferred from a roll 64 of reinforcement fiber fabric to the cylindrical containment vessel assembly 10 by relative rotation of the cylindrical containment vessel assembly 10 with respect to the roll 64 of reinforcement fiber fabric 62. For example, the cylindrical containment vessel assembly 10 may be rotated about a spindle 66, and the reinforcement fiber fabric 62 may pay off of a roll 64 of reinforcement fiber fabric. In another example, the cylindrical containment vessel 10 may be held stationary while the roll 64 of reinforcement fiber fabric is wound around the cylindrical containment vessel 10. In yet another example, the cylindrical containment vessel 10 may be rolled along a surface (not shown) adjacent to the roll 64 of reinforcement fiber fabric 62 such that reinforcement fiber fabric 62 rolls off of the roll 64 of reinforcement fiber fabric 62 and onto the cylindrical containment vessel 10. Thus, the reinforcement fiber fabric 62 is wrapped around the cylindrical containment vessel 10 in one or more layers.

Figure 5:
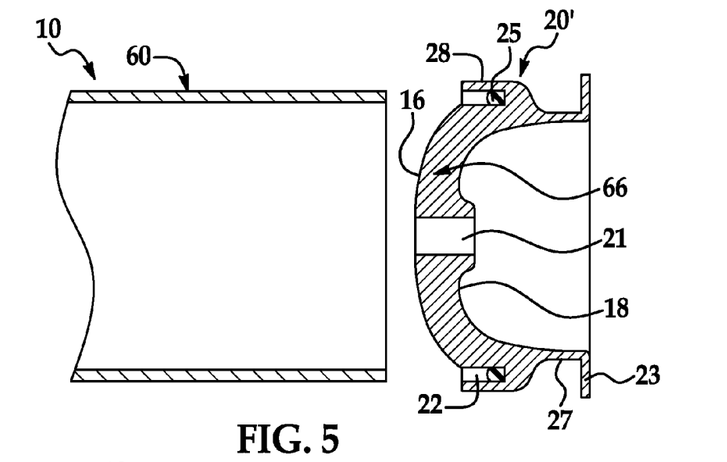
FIG. 5 is a cutaway, cross-sectional exploded view showing a body portion of the end cap having an inverted dome shape according to an example of the present disclosure.
Figure 6:
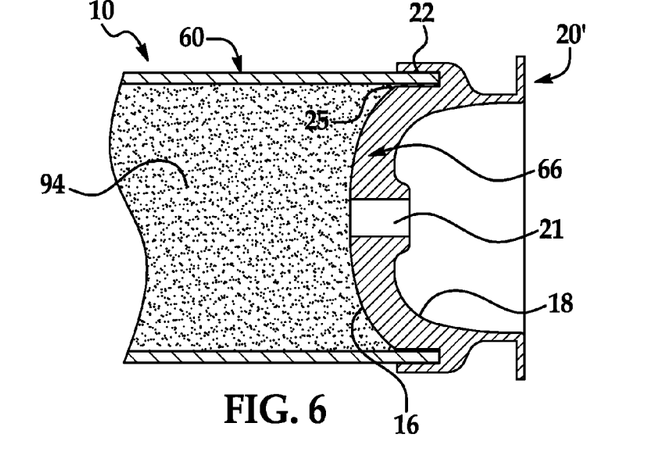
FIG. 6 is a cutaway, cross-sectional view of the parts in FIG. 5 after the parts are assembled.
Figure 7:
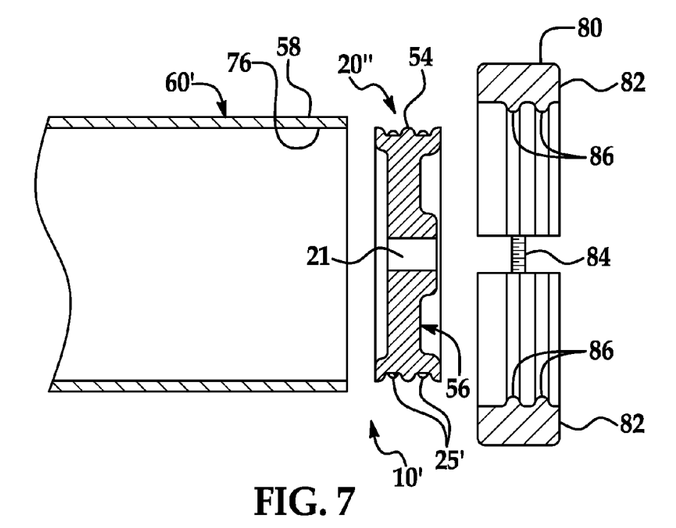
FIG. 7 is a cutaway, cross-sectional exploded view of yet another example of the present disclosure.

Referring now to FIGS. 5 and 6, the body portion 56 of the end cap 20' may have an inverted dome shape. As used herein, an inverted dome shape is a dome shape with a concavity of a cross sectional arch oriented opposite a load. In an example, the load may be pressure in a container. As shown in FIG. 6, a fluid 94 contained by the cylindrical containment vessel 10 would wet a pressurized surface 16 of the inverted dome 66, and the non-pressurized surface 18 is opposite the pressurized surface 16 of the inverted dome 66.

Figure 4A:
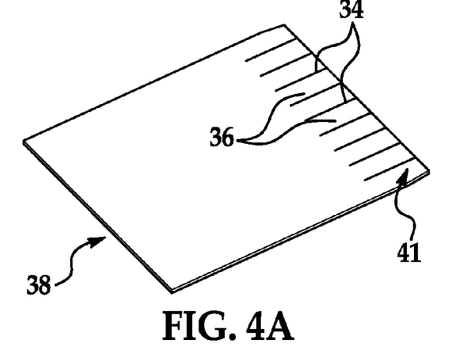
FIG. 4A is a perspective view of a portion of a rolled single sheet of fiber with slits cut in a border according to an example of the present disclosure.
Figure 4B:
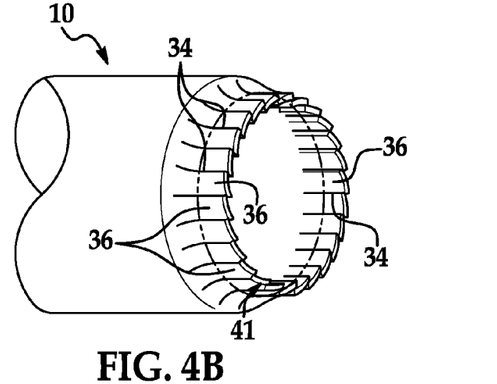
FIG. 4B is a perspective view of the portion of rolled single sheet of fiber in FIG. 4A, showing fringe tabs gathered smoothly according to an example of the present disclosure.

The assembly method may include cutting slits 34 in a border 41 of a sheet of fibers 38 of the second material layer 40 to form fringe tabs 36, as can be best seen in FIG. 4A. The fringe tabs 36 may be gathered substantially smoothly into the annular groove 27. As used herein, substantially smoothly means that wrinkles generally are not present, but an insignificantly small amount of wrinkling may exist when compared to the amount of wrinkling that would have existed if the slits 34 had not been made in the border 41 of the sheet of fibers 38.

The cylindrical containment vessel assembly 10 may be used to contain pressurized fluid 94. It is to be understood that fluids contained by the cylindrical containment vessel assembly 10 may be liquids, gases, mixtures, solutions, and combinations thereof. Materials contacted by the fluids contained by the cylindrical containment vessel assembly 10 may be selected to be chemically compatible with the fluid. In an example, the cylindrical containment vessel assembly 10 may be a fuel tank, and tubular member 60 may be a liner for the fuel tank.

Referring now to FIGS. 7, 8, 8A and 9, a sealant 25' is disposed into each of a plurality of annular slots 74 defined in an exterior surface 54 of the body portion 56 of an end cap 20". The end cap 20" is aligned with an end portion 58 of the tubular member 60' such that the exterior surface 54 of the body portion 56 abuts an interior surface 76 of the tubular member 60'. A force F may be applied to deform the tubular member 60' such that the end portion 58 of the tubular member 60' has conforming annular depressions 88 that conform to the plurality of annular slots 74 defined in the body portion 56 of the end cap 20". It is to be understood that the conforming annular depressions 88 may sealingly abut the plurality of annular slots 74, or an annulus 78 may remain between the interior surface 76 of the tubular member 60' and the exterior surface 54 of the body portion 56 of the end cap 20".

Figure 8:
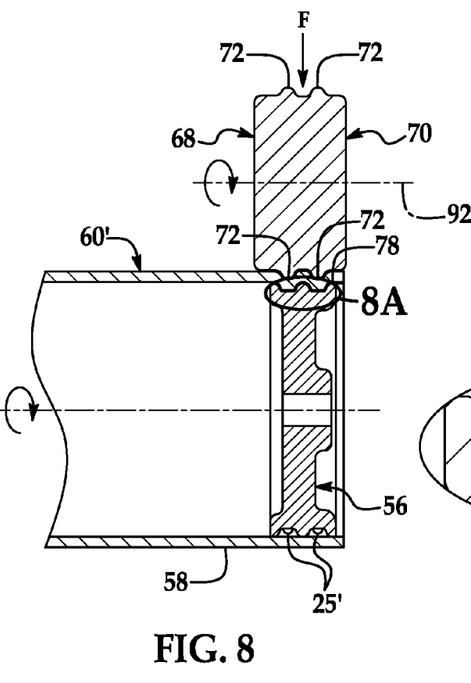
FIG. 8 is a cutaway, cross-sectional view showing a roller applying a force to a tubular member while rotating the tubular member, the force deforming the tubular member such that the end portion conforms to the plurality of grooves defined in the body portion of the end cap.
Figure 8A:
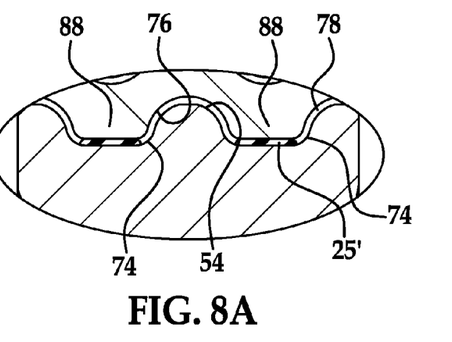
FIG. 8A is an enlarged view of the area at 8A in FIG. 8, showing a sealant.

It is to be further understood that the force F may be applied by crimping, swaging, or other similar means such that the tubular member 60' is deformed as disclosed above. The tool 68 may have rolling contact, sliding contact, non-sliding contact, or combinations thereof with the end portion 58 of the tubular member 60'. In a non-limitative example, the force F may be applied by rotating a tool 68 about the end cap 20". In another example, the tool 68 may rotate about a fixed axis of rotation 92. Further, the force F may be applied to the tubular member 60' while rotating the tubular member 60'.

In an example, applying the force F is accomplished by forcing a forming wheel 70 against the tubular member 60', the forming wheel 70 having a plurality of beads 72 formed thereon, as shown in FIG. 8. The plurality of beads 72 may be configured to align with the plurality of annular slots 74 defined in the body portion 56 of the end cap 20".

When the force F is applied, the sealant 25' may be distributed through the annulus 78 formed between the interior surface 76 of the tubular member 60' and the exterior surface 54 of the body portion 56 of the end cap 20".

The end cap 20" may be retained in the end portion 56 of the tubular member 60' via a locking ring 80. The locking ring 80 substantially prevents the end portion 58 of tubular member 60' from distorting under forces caused by pressure in the cylindrical containment vessel 10'. The locking ring 80 may be in two halves 82 drawn together by a threaded fastener 84, as shown schematically in FIG. 7. It is to be understood that the locking ring 80 may be securely held in place by more than one fastener, by interlocking pieces, or by other similar means. A single piece locking ring (not shown) may be pressed into place. The locking ring 80 may have annular surfaces 86 conforming to the annular depressions 88 in the tube 60'.

The sealant 25' may be cured by exposure to a chemical curing agent, exposure to a curing pressure, exposure to a curing temperature, or combinations thereof. It is to be understood that any of the curing agents listed above are also suitable for use in this example.

Figure 9:
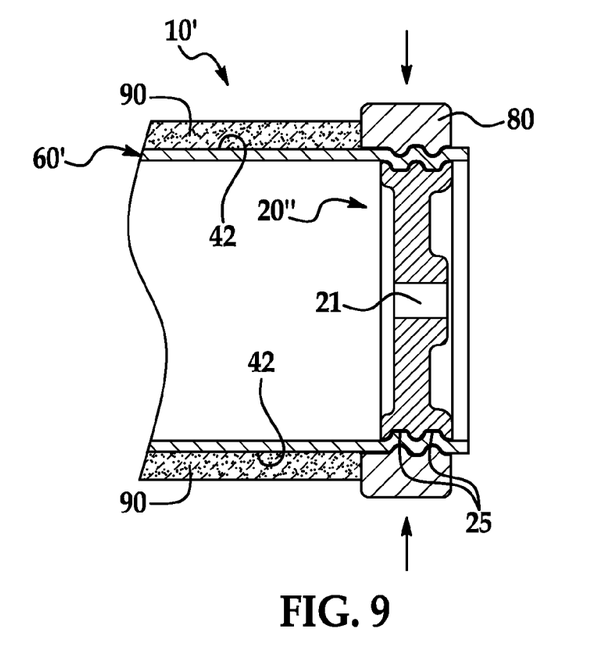
FIG. 9 is a cutaway, cross-sectional view showing the parts of FIG. 7 after assembly.

As shown in FIG. 9, a further embodiment of the cylindrical containment vessel is designated generally as 10'. At least one composite material layer 90 may be formed on an annular exterior surface 42 of the tubular member 60'. The composite material layer 90 may include glass or carbon fiber and a binding agent.

While several examples have been described in detail, it will be apparent to those skilled in the art that the disclosed examples may be modified. Therefore, the foregoing description is to be considered exemplary rather than limiting.

The invention claimed is:

1. A method for assembling a composite pressure vessel, comprising:
   fitting an end portion of a tubular member into an annular slot formed in a rim of a body portion of an end cap, the annular slot having a sealant disposed therein, the end cap further including an annular groove formed in an exterior surface of the body portion, the annular groove being opposed to the rim;
   forming a first material layer on an annular exterior surface of the tubular member, the layer including a first composite material including fibers having an orientation circumferential to the tubular member;
   forming a second material layer on the first material layer, the second material layer including a second composite material including fibers having an orientation axial to the tubular member;
   cutting slits in a border of a sheet of fibers of the second material layer to form fringe tabs;
   gathering the fringe tabs of the sheet of fibers substantially smoothly into the annular groove; and
   forming a third material layer adjacent the second material layer and in the annular groove, the third material layer including a third composite material including fibers having an orientation circumferential to the tubular member.

2. The assembly method as defined in claim 1 wherein the forming of the first, second, and third material layers is accomplished by roll forming.

3. The assembly method as defined in claim 1 wherein the fitting of the end portion of the tubular member into the annular slot is accomplished via press fitting, threading, swaging, staking or welding.

4. The assembly method as defined in claim 1, further comprising curing the sealant via exposure to a chemical curing agent, exposure to a curing pressure, exposure to a curing temperature, or combinations thereof.

5. The assembly method as defined in claim 1 wherein the body portion of the end cap has an inverted dome shape, and wherein a concavity of a cross sectional arch of the inverted dome shape is oriented opposite a pressure load when positive pressure is contained by the composite pressure vessel.

6. A composite pressure vessel, comprising:
   an end cap, including:
      a body portion having a rim;
      a longitudinally opening annular slot formed in the rim; and an annular groove formed in an exterior surface of the body portion, the annular groove being opposed to the rim;
a tubular member including an end portion press fit into the annular slot of the end cap, wherein:
the body portion defines an outer wall of the annular slot;
the body portion defines an inner wall of the annular slot parallel to the outer wall; and
the body portion defines an end wall of the slot at an end of the annular slot opposite to an opening of the slot in the rim;
a first material layer formed on a cylindrical exterior surface of the tubular member, the layer including a first composite material including fibers having a circumferential orientation with respect to the cylindrical surface;
a second material layer formed on the first material layer and in the annular groove, the second material layer including a second composite material including fibers having an orientation axial to the tubular member;
fringe tabs defined by slits cut in a border of a sheet of fibers of the second material layer, wherein the fringe tabs are substantially smoothly gathered into the annular groove; and
a third material layer formed adjacent to the second material layer in the annular groove, the third material layer including a third composite material including fibers having an orientation circumferential to the tubular member.

7. The composite pressure vessel as defined in claim 6 wherein the first material layer abuts the rim of the body portion of the end cap.

8. The composite pressure vessel as defined in claim 6 wherein the body portion of the end cap has an inverted dome shape, and wherein a concavity of a cross sectional arch of the inverted dome shape is oriented opposite a pressure load when positive pressure is contained by the composite pressure vessel.

9. The composite pressure vessel as defined in claim 6 wherein the annular groove is partially defined by a retention flange.

10. The composite pressure vessel as defined in claim 6, further comprising a sealant disposed in the annular slot, the sealant being selected from an elastomeric material.

11. The composite pressure vessel as defined in claim 6 wherein the first, second, and third composite materials are individually selected from carbon fibers or glass fibers including a binding agent.

12. The composite pressure vessel as defined in claim 6 wherein the first material layer has an outer diameter that is substantially the same as an outer diameter of the body portion of the end cap.

13. The composite pressure vessel as defined in claim 6 wherein the tubular member is a liner for a fuel tank.

* * * * *